United States Patent

Wang et al.

[11] Patent Number: 5,827,407
[45] Date of Patent: Oct. 27, 1998

[54] INDOOR AIR POLLUTANT DESTRUCTION APPARATUS AND METHOD USING CORONA DISCHARGE

[75] Inventors: John H. S. Wang, Rancho Palos Verdes; Weldon S. Williamson, Malibu; Nelson William Sorbo, Redondo Beach, all of Calif.

[73] Assignee: Raytheon Company, El Segundo, Calif.

[21] Appl. No.: 689,997

[22] Filed: Aug. 19, 1996

[51] Int. Cl.$^6$ .................................................. A62D 3/00
[52] U.S. Cl. ............................ 204/164; 588/227; 95/81; 96/58
[58] Field of Search ........................ 204/164, 176, 204/165; 95/81; 96/58; 588/227

[56] References Cited

U.S. PATENT DOCUMENTS

| 4,734,105 | 3/1988 | Eliasson et al. | 95/62 |
| 5,593,560 | 1/1997 | Inoue | 204/671 |
| 5,628,881 | 5/1997 | Lemelson | 204/164 |

*Primary Examiner*—Kathryn L. Gorgos
*Assistant Examiner*—Kishor Mayekar
*Attorney, Agent, or Firm*—Leonard A. Alkov; William C. Schubert; Glenn H. Lenzen, Jr.

[57] ABSTRACT

An indoor air pollutant destruction apparatus destroys pollutants by a corona discharge that is generated by a rapidly oscillating electric field. Free electrons generated by the corona discharge produces ozone ($O_3$), which effectively destroys volatile organic compounds (VOCs) and biological forms such as bacteria, fungi, viruses and spores. Fine particulate materials such as smoke and dust are charged by the corona discharge, and when they pass through the rapidly oscillating electric field, they coagulate to form larger particles which are then filtered out.

5 Claims, 3 Drawing Sheets

INDOOR AIR POLLUTANT DESTRUCTION APPARATUS AND METHOD USING CORONA DISCHARGE

BACKGROUND OF THE INVENTION

1. Field of the Invention

This invention relates to indoor air pollutant destruction using corona discharge generated by a rapidly oscillating electric field.

2. Description of the Related Art

Passing a pollutant bearing gas through a corona discharge site is a known method of removing the pollutants from the gas. A general review of this technique is provided in Puchkarev et al., "Toxic Gas Decomposition by Surface Discharge," *Proceedings of the* 1994 *International Conf. on Plasma Science*, Jun., 6–8, 1994, Santa Fe, New Mexico, paper No. 1E6, page 88. Corona pollutant destruction has also been proposed for liquids, as disclosed in application Ser. No. 08/295,959, filed Aug. 25, 1994, "Corona Source for Producing Corona Discharge and Fluid Waste Treatment with Corona Discharge," and assigned to Hughes Aircraft Company, now doing business as Hughes Electronics.

In one system, described in Yamamoto et al., "Decomposition of Volatile Organic Compounds by a Packed Bed Reactor and a Pulsed-Corona Plasma Reactor," *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 87–89, brief high voltage pulses of about 120–130 nanoseconds duration are applied to the center conductor of a coaxial corona reactor through which gas is flowing. Each pulse produces a corona discharge that emanates from the center wire and floods the inside volume of the reactor with energetic electrons at about 5–10 keV. A similar system is described in Pat. No. 4,695,358, in which pulses of positive DC voltage are superimposed upon a DC bias voltage to generate a streamer corona for removing $SO_x$ and $NO_x$ from a gas stream. These processes have relatively poor energy efficiencies. With the reactor geometries that have been selected, it is necessary to deliver very short pulses to avoid arc breakdown between the electrodes, and consequent damage. The pulse-forming circuit loses approximately half of the power coming from a high voltage supply in a charging resistor, and additional energy is wasted in a double spark gap. Furthermore, the capacitive load of the coaxial corona reactor must be charged; this charging energy is typically much greater than the energy that is used in the corona reaction itself, and simply decays away into heat after each pulse without contributing to the pollutant destruction.

A similar approach, but with a different reactor geometry, is taken in Rosocha et al., "Treatment of Hazardous Organic Wastes Using Silent-Discharge Plasmas," *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 79–80, in which the corona discharge is established between parallel plates. This system also suffers from a poor specific energy due to inefficient pulse formation and non-recovery of reactor charging energy.

The treatment of $NO_x$ by plasma techniques is described in R. W. Breault et al., "Reaction Kinetics for Flue Gas Treatment of $NO_x$," *Non-Thermal Plasma Techniques for Pollution Control*, NATO ASI Series Vol. G34, Part B, 1993, page 239. The article describes the reaction sequence of $NO_x$ reduction in a corona discharge reactor, which generates plasma by high-voltage corona discharge.

The generation of a corona is described in W. C. Hinds, *Aerosol Technology*, John Wiley & Sons, Inc., 1982, pages 299–300. In the corona region, electrons are accelerated to a velocity sufficient to knock an electron from a gas molecule upon collision and thereby create a positive ion and an electron. Within the corona region, this process takes place in a self-sustaining avalanche which produces a dense cloud of free electrons and positive ions around the electrode called corona discharge. If the inner electrode is positive with respect to the outer electrode, the electrons will move rapidly to the inner electrode and the positive ions will stream away from the inner electrode to the outer electrode in a unipolar "ion wind." If the inner electrode is negative with respect to the outer electrode, the positive ions will migrate to the inner electrode and the electrons will be repelled to the outer electrode. As their velocities slow with decreasing field strength, electrons attach to gas molecules to form negative ions, which stream across the tube.

The corona generates radicals (H, OH, O, etc.) which ultimately form ozone ($O_3$). Ozone is a highly reactive species and destroys volatile organic compounds (VOCs) and biological forms such as bacteria, fungi, viruses and spores by oxidizing them. The radicals OH and O are also very efficient oxidizers of all VOCs and biological forms. Moreover, particulate materials such as dust and tobacco smoke are also charged when collided with charged ions.

An indoor pollutant treatment system using a high-voltage DC electric field to impart charges to fine particles and a separate high-frequency electric field to coagulate the particles is described in CRS Industries, Inc., "COSA-TRON" Product Literature, 1993. Separate electric fields require separate power supplies with different power generation characteristics as well as separate sets of electrodes, one for generating ions to charge the particles and another for coagulating the charged particles.

SUMMARY OF THE INVENTION

The present invention provides an indoor air treatment apparatus using corona discharge generated by a rapidly oscillating electric field.

In one embodiment, a power source generates a high-voltage pulse-modulated sinusoidal signal to produce a high-intensity rapidly oscillating electric field that induces corona discharges in a reactor. The power source may be controlled by a computerized controller, which monitors the concentration levels of pollutants in the air from one or more pollutant sensors and directs the power source to generate power with signal characteristics that are desirable for treatment of the pollutants.

The rapidly oscillating electric field in the corona discharge reactor also causes charged particulate materials to coagulate. The free ions generated by a corona discharge charge particulate materials such as smoke and dust. When the charged particulate materials pass through a rapidly oscillating electric field, they coagulate to form larger particles, which are filtered out by a conventional dust filter after the air passes through the corona discharge reactor.

An advantage of the present invention is that the same oscillating electric field that is used to generate free ions to charge the particulate materials is also used to coagulate them, thereby requiring only one power source and one set of electrodes.

These and other features and advantages of the invention will be apparent to those skilled in the art from the following detailed description, taken together with the accompanying drawings, in which:

DETAILED DESCRIPTION OF THE INVENTION

The present invention concerns a system for destruction of gaseous pollutants, particulate materials, volatile organic compounds (VOCs) and biological forms in indoor air employing a corona discharge reactor.

Figure 1:
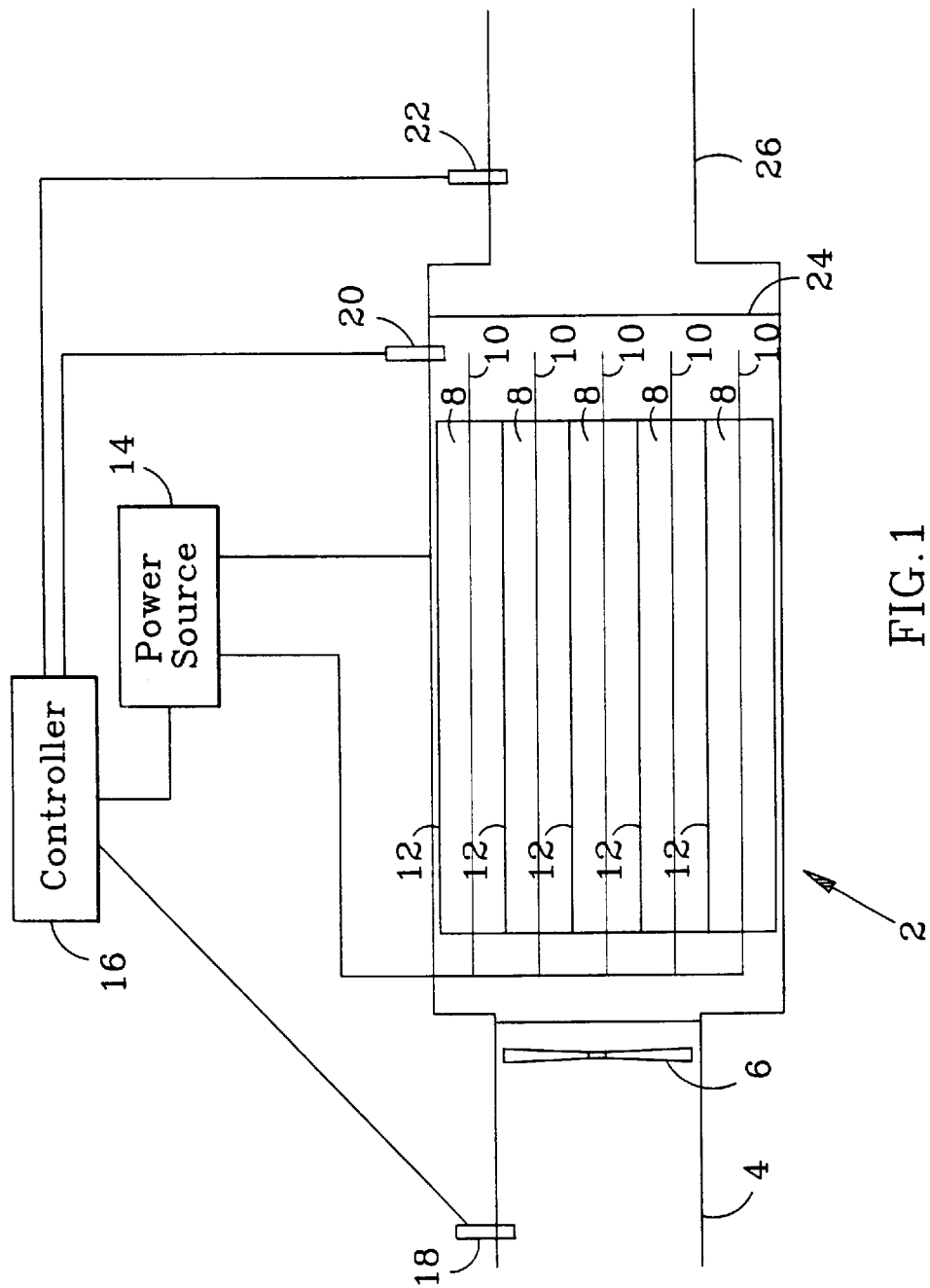
FIG. 1 is a block diagram of a corona discharge indoor air treatment system.

In accordance with the invention, an embodiment of which is schematically shown in FIG. 1, a corona discharge reactor 2 has an inlet conduit 4 in which a fan 6 is positioned to force air to flow into the reactor. Either a single chamber structure or a multiple chamber structure can be implemented in the corona discharge reactor 2. In a preferred embodiment that enhances the treatment of all portions of the air flowing through the reactor 2, the reactor has multiple reactor elements 8 positioned in parallel with each other in the stream of air flow. Each reactor element has a chamber that contains an inner electrode 10 and is enclosed by an outer electrode 12. The inner and outer electrodes 10 and 12 are connected to a power source 14, which supplies high power electricity to produce plasma in the chambers of the reactor elements 8. High voltage differences between the inner and outer electrodes generate strong electric fields within each of the chambers.

Figure 2A:
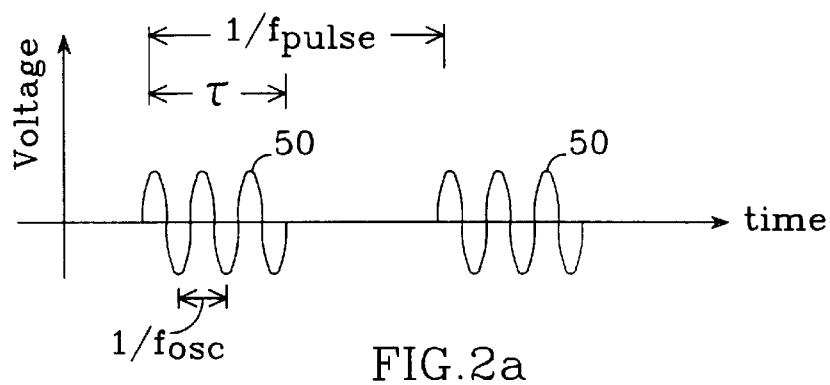
FIG. 2a is a plot of voltage versus time for a typical gated sine waveform generated by the power source.
Figure 2B:
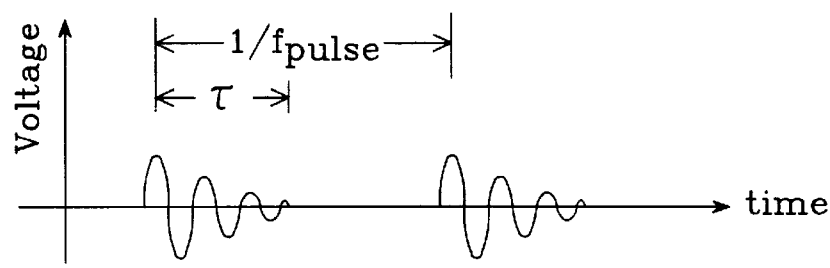
FIG. 2b is a plot of voltage versus time for a typical pulse-modulated sinusoidal waveform generated by the power source.

The high frequency electric field is generated by the power source 14 with high voltage pulses. The pulses may have a gated sine waveform 50 as shown in FIG. 2a or a pulse-modulated waveform as shown in FIG. 2b. The gated sine waveform has a pulse repetition frequency $f_{pulse}$, and the sinusoid has an oscillation frequency $f_{osc}$. The pulse repetition frequency $f_{pulse}$ is preferably in the range of about 0.1–100 kHz, and $f_{osc}$ is preferably about 5 to 10 times that of $f_{pulse}$. Each pulse has the duration of a pulse width τ. The average power supplied to the corona discharge reactor 2 can be adjusted by varying the pulse duty cycle, which is defined as the product of the pulse width τ and the pulse repetition frequency $f_{pulse}$. Depending upon the application, the power required for corona discharge generation to treat indoor air may be less than the power required to treat exhaust gas from an internal combustion engine, but the voltage difference between each pair of inner and outer electrodes must be large enough, that is, generally in the range of about 5–15 kV, to produce a corona discharge.

The power source 14 may be designed to produce either fixed or variable power to optimize treatment of the pollutants. In a variable power source, any of the pulse-modulated sinusoidal or gated sine wave voltage signal characteristics, such as voltage level, pulse width, pulse repetition frequency and oscillation frequency, may be varied to adjust the signal's average power. For example, varying the pulse width and/or the pulse repetition frequency changes the duty cycle, which affects the average power for corona generation. In a preferred embodiment, the power source 14 is controlled by a computerized controller 16 that responds to inputs from one or more pollutant sensors 18, 20, 22 that sense the amounts of pollutants in the air before and/or after treatment. At least one sensor 18 is preferably placed in the inlet conduit 4 to sense the pollutant contents in the untreated air. If the sensed amounts of pollutants are increased, the controller 16 directs the variable power source 14 to increase the power to generate greater corona discharge. If the pollutant level goes down, the power is decreased to conserve energy.

Figure 3:
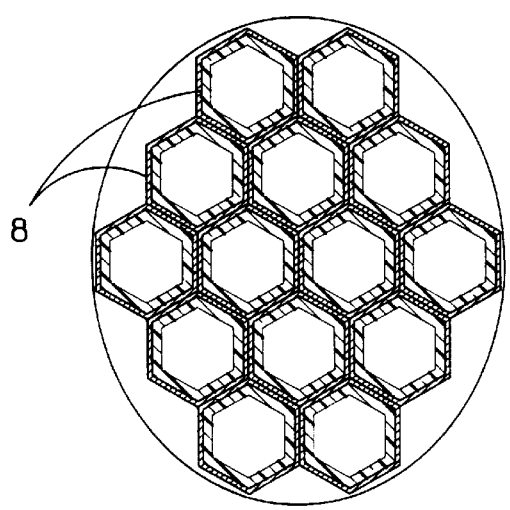
FIG. 3 is a sectional view of a corona reactor in accordance with the invention with multiple reactor chambers.
Figure 4:
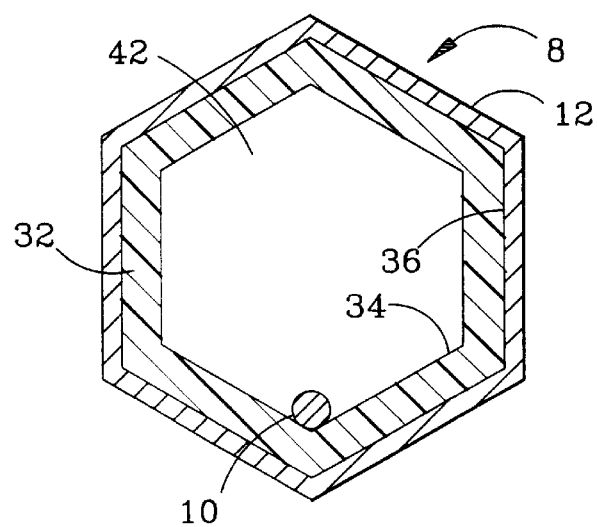
FIG. 4 is a detailed sectional view of one of the corona discharge chambers shown in FIG. 2.
Figure 5A:
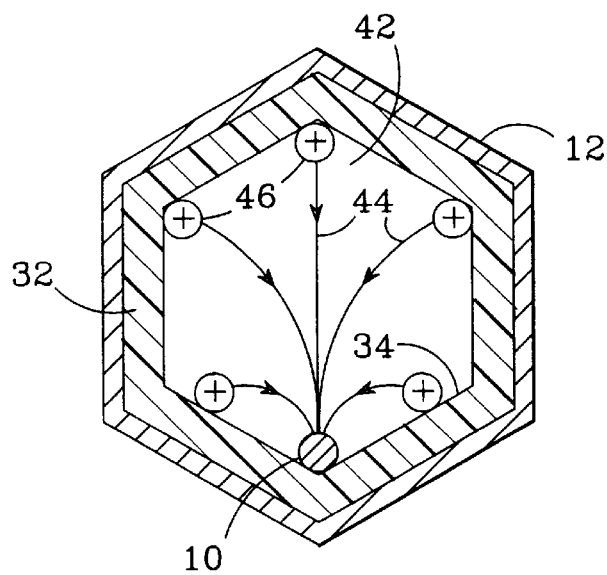
FIG. 5a is a view similar to FIG. 3 but showing electric field lines and positive charges within the reactor chamber.

FIG. 3 shows a preferred embodiment of a corona discharge reactor with multiple reactor elements 8 arranged in parallel in the path of air flow, while FIG. 4 is a more detailed view of one of the reactor elements 8 of FIG. 3. Each reactor element 8 is defined by the interior space of a hollow cylindrically shaped dielectric 32 that is formed from a material which exhibits low loss tangent at the oscillation frequency. The cylindrical dielectric may have various cross-sectional shapes, but in a corona discharge reactor with multiple reactor elements, it is preferred that it have an equilateral hexagonal cross-section so that the reactor elements 8 can be placed adjacent each other for tight spatial packing and strong mechanical support. The hollow cylindrical dielectric 32 has an inner surface 34 and an outer surface 36. The inner surface 34 defines an individual reactor chamber 42 which contains at least one inner electrode 10 formed from a conductive material. The inner electrode 10 is preferably positioned along a vertex of the inner surface 34. A layer of a conductive material encloses the dielectric's outer surface 36 to form an outer electrode 12. When a positive voltage is applied to the outer electrode 12 relative to the inner electrode 10, an electric field is produced in the reactor chamber 42 with electric field lines 44 as shown in FIG. 5a. The electric field charges the dielectric 32, which builds up positive charges 46 on its inner surface 34. If the electric field intensity is high enough, a corona discharge occurs, thereby generating free charges within the reactor chamber 42.

Figure 5B:
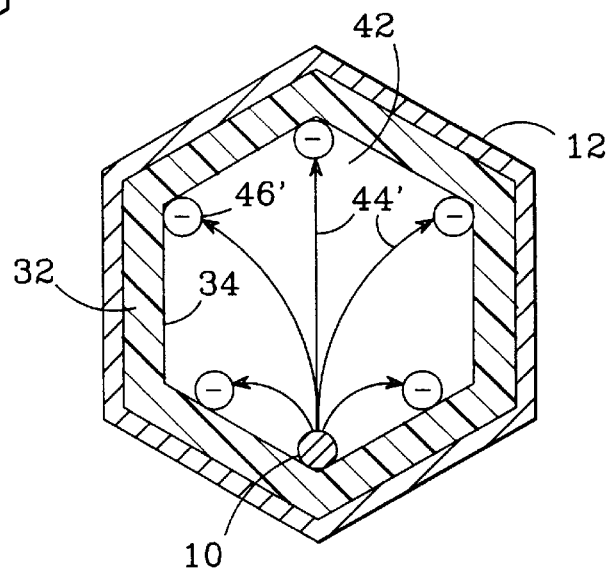
FIG. 5b is a view similar to FIG. 5a but showing the electric field lines in opposite directions and negative charges within the chamber.

In the corona region of the reactor, both positive and negative charges are produced. When the inner electrode 10 is at a positive voltage peak relative to the outer electrode 12, as shown in FIG. 5b, the directions of the electric field lines 44' are opposite to those shown in FIG. 5a, and negative charges 46' are formed on the inner dielectric surface 34. The high voltage electric field resulting from high voltage oscillation operating at $f_{osc}$ shown in FIGS. 2a or 2b accelerates electrons to a velocity sufficient to knock an electron from a gas molecule upon collision and thereby create a positive ion and an electron. The electrons attach to gas molecules to form negative ions, which stream across the reactor chamber.

A corona discharge produces electrons that react with molecules in the gas to produce radicals such as H, OH and O which subsequently form ozone ($O_3$). Ozone is a highly reactive oxidizer and is efficient in destroying VOCs and biological forms such as bacteria, fungi, viruses and spores.

Charges generated by the corona discharge as shown in FIG. 5a are useful in treating particulate materials such as dust, tobacco smoke and pollen. Fine particles found in media such as smoke generally cannot be filtered out by conventional fabric filters. The free charges generated by corona discharge in a reactor chamber collide with the fine particles, which are basically dielectric materials, and impart charges to them. As the charged particles flow downstream, they are subjected to the rapidly oscillating electric field, which forces them to coagulate to form larger particles that can be captured by a conventional fabric filter. The electric field applied to the particles for coagulation are the same as that for generating a corona discharge. When the charged particles pass through the high-intensity rapidly oscillating electric field at an oscillation frequency $f_{osc}$, they oscillate with the electric field, which increases the coagulation potential. In a preferred embodiment shown in FIG. 1, a conventional fabric filter 24 is placed downstream of the reactor elements 8 to filter out the large coagulated particles.

Figure 6:
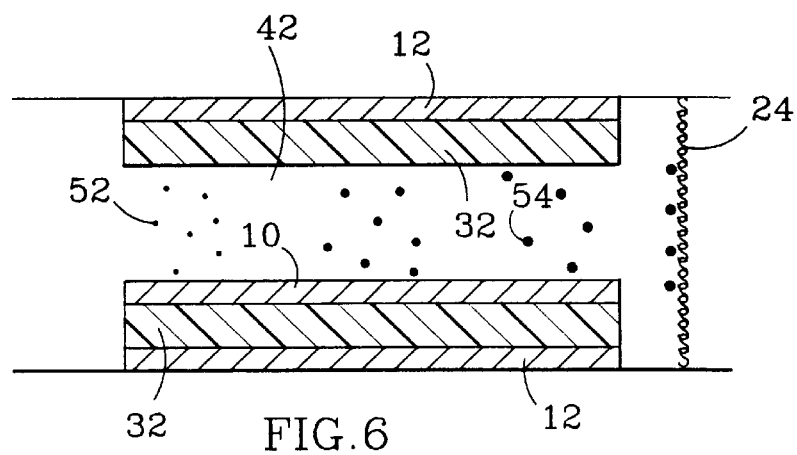
FIG. 6 is a sectional view of a reactor chamber and a fabric filter showing progressive coagulation and filtering of particulate materials.

FIG. 6 shows the process of progressive coagulation of charged fine particles 52 into larger particles 54, which can be filtered by the fabric filter 24. The inner and outer electrodes 10 and 12, when energized, generate a rapidly oscillating electric field that is used for both corona discharge and coagulation of the charged particles. In this configuration, only one set of electrodes and one power source are needed to perform corona generation and particle coagulation.

It is further preferred that a sensor 20 be placed between the output of the reactor elements 8 and the filter 24 to sense the amounts of particulate materials before filtering, and that another sensor 22 be placed in the outlet conduit 26 downstream of the filter 24 to sense the amounts of particulate materials and other pollutants after filtering. Either sensor 20 or 22 is preferably also equipped to sense the amount of $O_3$, which was generated in the reactor elements 8 to oxidize the VOCs and biological forms, but is preferably completely destroyed during the oxidization reactions, so that no excess $O_3$ exits the outlet conduit 26. The controller 16 compares the amounts of particulate materials before and after filtering, and adjusts the characteristics of the signal generated by the power source 14 to enhance the coagulation potential of the particulate materials as well as the treatment of other pollutants such as VOCs and biological forms. The power source 14 is also adjusted so that the corona discharge reactor 2 generates enough $O_3$ to effectively oxidize the VOCs and biological forms, but at the same time prevents the generation of excess $O_3$, which is itself a pollutant that would cause unpleasant odor in the air, from leaving the reactor.

While one illustrative embodiment of the invention has been shown and described, numerous variations and alternate embodiments will occur to those skilled in the art. Such variations and alternate embodiments are contemplated, and can be made without departing from the spirit and scope of the invention as defined in the appended claims.

We claim:

1. An air cleaning method, comprising:

generating an oscillating electric field to produce a corona discharge that releases free charges;

conveying air that includes an amount of fine particulate material pollutants through said corona discharge;

imparting said free charges to said particulate materials;

applying said oscillating electric field to said charged particulate materials to coagulate said charged particulate materials into relatively larger particles; and filtering out said relatively larger particles.

2. The method of claim 1, wherein said electric field is generated by a rapidly oscillating voltage signal.

3. The method of claim 2, wherein said oscillating voltage signal has a pulse repetition frequency in the range of about 0.1–100 kHz.

4. The method of claim 2, further comprising:

sensing the amount of said pollutants in said air; and controlling said rapidly oscillating voltage singal's characteristics according to the sensed amount of said pollutants.

5. The method of claim 1, for cleaning air that also includes volatile organic compounds (VOCs), biological forms, or a mixture thereof further comprising:

imparting said free charges to air moleucles to generate radicals that form $O_3$; and oxidizing said VOCs, said biological forms, or said mixture thereof with said $O_3$.

* * * * *